US006687279B2

United States Patent
Ullman et al.

(10) Patent No.: US 6,687,279 B2
(45) Date of Patent: *Feb. 3, 2004

(54) INTEGRATED DUAL SOURCE RECYCLING SYSTEM FOR CHEMICAL OXYGEN-IODINE LASER WEAPON SYSTEMS

(75) Inventors: Alan Z. Ullman, Northridge, CA (US); William E. McDermott, Rancho Palos Verdes, CA (US)

(73) Assignee: The Boeing Company, Chicago, IL (US)

(*) Notice: Subject to any disclaimer, the term of this patent is extended or adjusted under 35 U.S.C. 154(b) by 368 days.

This patent is subject to a terminal disclaimer.

(21) Appl. No.: 09/730,722

(22) Filed: Dec. 6, 2000

(65) Prior Publication Data

US 2002/0067753 A1 Jun. 6, 2002

(51) Int. Cl.[7] ................................................. H01S 3/095
(52) U.S. Cl. ............................................. 372/89; 372/59
(58) Field of Search ........................... 372/55, 59, 60, 372/89

(56) References Cited

U.S. PATENT DOCUMENTS

| 3,992,685 A | 11/1976 | Ogren et al. |
| 4,028,069 A | 6/1977 | Nolley, Jr. et al. |
| 4,188,592 A | 2/1980 | Buczek et al. |
| 4,210,877 A | 7/1980 | Pleasance et al. |
| 4,272,681 A | 6/1981 | Fill et al. |
| 4,357,309 A | 11/1982 | Arnold et al. |
| 4,467,474 A | 8/1984 | Davis et al. |
| 4,535,457 A | 8/1985 | Schlie et al. |
| 4,622,676 A | 11/1986 | Benard |
| 4,653,062 A | 3/1987 | Davis et al. |
| 4,780,880 A | 10/1988 | Dickerson |
| 4,787,091 A | 11/1988 | Wagner |
| 4,905,247 A | 2/1990 | Glessner et al. |
| 5,199,041 A | 3/1993 | Schmiedberger et al. |
| 5,301,203 A | 4/1994 | Schlie et al. |
| 5,658,488 A * | 8/1997 | Lonergan et al. ...... 252/186.43 |
| 5,725,834 A | 3/1998 | Nishii et al. |
| 5,802,093 A | 9/1998 | Townsend et al. |
| 5,802,095 A | 9/1998 | Schall |
| 5,859,863 A | 1/1999 | Clendening, Jr. et al. |
| 5,870,422 A | 2/1999 | Florentino et al. |
| 5,883,916 A | 3/1999 | Lohn et al. |
| 5,889,807 A | 3/1999 | Cunningham et al. |
| 5,900,219 A | 5/1999 | Schall et al. |
| 5,907,573 A | 5/1999 | Ullman et al. |
| 5,925,286 A | 7/1999 | Clendening, Jr. et al. |
| 5,974,072 A | 10/1999 | Hartlove et al. |
| 6,004,449 A | 12/1999 | Vetrovec |
| 6,010,640 A | 1/2000 | Beshore et al. |
| 6,049,557 A | 4/2000 | Cunningham et al. |
| 6,377,600 B1 * | 4/2002 | Flegal .......................... 372/89 |
| 6,501,780 B2 * | 12/2002 | Carroll et al. ................. 372/55 |

* cited by examiner

*Primary Examiner*—Paul Ip
*Assistant Examiner*—Davienne Monbleau
(74) *Attorney, Agent, or Firm*—Harness Dickey & Pierce P.L.C.

(57) ABSTRACT

An integrated dual source recycling system for a chemical oxygen-iodine laser system is described. The recycling system primarily includes: (1) a first collection system for collecting an amount of spent basic hydrogen peroxide comprised of spent aqueous potassium chloride; and (2) a second collection system for collecting an amount of the spent laser exhaust gas. Several processing systems are also employed to convert the spent aqueous potassium chloride and the spent laser exhaust gas into hydrogen peroxide and potassium hydroxide which are mixed together to form fresh basic hydrogen peroxide. Additionally, the spent laser exhaust gas is recycled back into molecular nitrogen, molecular iodine, molecular oxygen, and molecular chlorine.

20 Claims, 1 Drawing Sheet

INTEGRATED DUAL SOURCE RECYCLING SYSTEM FOR CHEMICAL OXYGEN-IODINE LASER WEAPON SYSTEMS

TECHNICAL FIELD

The present invention relates generally to chemical laser systems, and more particularly to a new and improved integrated dual source recycling system for collecting, reprocessing and recycling various chemical species that are used by chemical laser weapon systems.

BACKGROUND OF THE INVENTION

The fact that an atom will emit a photon of radiation when one of its electrons drops to a lower energy state has enabled the laser to be employed in a number of military, industrial, and medical applications. The term "laser" is an acronym for light amplification by stimulated emission of radiation. In its simplest form, a laser consists of a rod of transparent crystal or a tube filled with gas or liquid. A reflecting mirror is placed at one end and a partially reflecting mirror at the other end. The laser is then pumped by adding energy, e.g., by shining another light source into it, by adding electrical energy, or by stimulating a chemical reaction. This process raises electrons in the laser to higher energy states.

During or subsequent to the pumping process, some of the electrons will spontaneously fall back to a lower energy state, emitting photons. The photons that travel toward the sides of the laser are quickly lost, but those traveling along the length of the rod or tube are reflected back by the mirrors. This activity generally occurs in the area commonly referred to as the laser gain region. When these photons strike other excited atoms, they stimulate those atoms to release photons of the exact same energy level (or wavelength), which travel in the same direction as the stimulating photons. The result is an intense, highly focused beam of light escaping through the half-silvered end of the laser. This light beam is generally referred to as a beam of coherent radiation, or more commonly, a laser beam.

Because the photon wavelength is determined by the characteristics of the atoms in the lasing material, laser light can be of a single wavelength. Because laser light travels in a tight beam, it can carry a great deal of energy over a great distance without significant loss. With respect to recent developments in laser technology, there has been increased interest in high-energy chemical laser systems.

Current high-energy chemical lasers can be classified as either: (1) hydrogen-halide lasers; or (2) chemical oxygen-iodine lasers (COIL). Hydrogen-halide lasers typically employ a reaction of hydrogen and/or deuterium with fluorine, chlorine, bromine or iodine in diluent gases of helium, nitrogen, or the like, to produce hydrogen and/or deuterium halide molecules in excited vibrational states from which laser energy can be extracted. Exhaust from the laser cavity of a hydrogen-halide laser is typically a mixture of gases at high temperature (up to 1000° C.) including HF (and/or DF), He, N2, and possibly small amounts of H2 (and/or D2), and other gases.

In current COIL systems, chlorine gas, with or without a diluent gas such as nitrogen or helium, reacts at low pressure with a solution of basic hydrogen peroxide (i.e., usually NaOH, KOH or other strong base mixed with hydrogen peroxide) to produce a gaseous flow of excited oxygen, also referred to as singlet delta oxygen or singlet molecular oxygen (designated as O2*, O2(1Δ), as well as by other symbols). This gaseous flow of singlet delta oxygen mixes (typically at speeds approaching or even exceeding the speed of sound) with iodine gas molecules (i.e., I2) generally mixed with a diluent gas such as nitrogen or helium, dissociating them and exciting the resulting iodine atoms (i.e., I), which lase at 1.315 μm. The major laser byproducts are various salts (e.g., NaCl or KCl), water, and heat. Exhaust from the COIL laser cavity is typically a mixture of gases at near ambient temperature, including nitrogen or helium, oxygen, and small amounts of chlorine, iodine, and water. The gas is recompressed, the small amounts of chlorine and iodine can be scrubbed from the output, and the resulting gas exhausted.

The intended operation of a conventional COIL system can be summarized as follows. The initial step is to generate the singlet delta oxygen. This is accomplished by providing a source of basic hydrogen peroxide, typically in liquid form, and a source of molecular chlorine, typically in gaseous form. These two materials are then charged or injected into a singlet delta oxygen generator through appropriate manifold/conduit assemblies, respectively. The resulting exothermic reaction between the basic hydrogen peroxide liquid and the molecular chlorine gas produces the gaseous singlet delta oxygen, as well as several by-products, such as salt and heat. The heat can be removed by appropriate devices such as a heat exchanger, and the salt can be removed by appropriate devices such as a filter, if desired.

Once the gaseous singlet delta oxygen is generated, it is then charged or injected in flow form into a mixing nozzle at the appropriate time. The mixing nozzle has a throat portion which generally divides the mixing nozzle into a subsonic zone and a supersonic zone; that is, the flow of gaseous singlet delta oxygen is subsonic in one portion of the mixing nozzle and supersonic at the other portion of the mixing nozzle. The mixing of reactants is typically done in the subsonic zone, but their mixing can be done in other zones of the gain generator.

A molecular iodine generator is in communication with the mixing nozzle by an appropriate manifold/conduit assembly. At the appropriate time, gaseous molecular iodine is then charged or injected into the mixing nozzle in such a manner so as to partially or completely mix with the singlet delta oxygen gas flowing from the singlet delta oxygen generator. The mixing permits the singlet delta oxygen to dissociate some of the molecular iodine and thereby initiate the chain reaction dissociation by the product, excited atomic iodine.

The primary reactions taking place in connection with the conventional COIL system are as follows:

$$I2+NO2^* \rightarrow I2^*+NO2. \tag{1}$$

That is, a mole of molecular iodine reacts with several moles (denoted by the symbol "N") of singlet delta oxygen to produce a mole of excited molecular iodine and several moles of molecular oxygen.

$$I2^*+O2^* \rightarrow 2I+O2. \tag{2}$$

That is, a mole of excited molecular iodine reacts with a mole of singlet delta oxygen to produce two moles of atomic iodine and a mole of molecular oxygen.

$$I+O2^* \rightarrow I^*+O2. \tag{3}$$

That is, a mole of atomic iodine reacts with a mole of singlet delta oxygen to produce a mole of excited atomic iodine and a mole of molecular oxygen.

$$I^*+h\nu \rightarrow I+2h\nu. \tag{4}$$

That is, a molecule of excited atomic iodine interacts with a photon and releases a second photon (hv), thus producing a molecule of atomic iodine.

The singlet delta oxygen gas flow initially contacts the gaseous molecular iodine gas at subsonic speed; however, the singlet delta oxygen gas flow is quickly brought up to near supersonic or even supersonic speed (via appropriate devices such as a venturi) and is expelled out through the mixing nozzle into the area known as the laser cavity or laser gain region. It is in this area where the excited atomic iodine releases its photon. The released photons are then reflected between a set of mirrors, the first mirror being fully reflective, the second mirror being partially reflective. The reflected photons eventually form a laser beam, which is transmitted through the partially reflective mirror at a wavelength of 1.315 μm. Any remaining chemical species are removed from the laser gain region by a combination of exhaust assemblies and scrubber assemblies in order to avoid contamination of the laser's mirrors and to allow continuing flow of the laser chemicals so as to sustain the lasing process.

One particular application of chemical laser systems that is of significant interest is in space-based lasers (SBL's). As part of a ballistic missile defense system, SBL's have the potential of intercepting and destroying enemy missiles prior to them reaching their intended targets. An SBL system would achieve missile interception by focusing and maintaining a high powered laser on a target until it achieves catastrophic destruction. Because the SBL system typically requires very large amounts of laser power to achieve it's operational objectives, it is unlikely that an electrically driven laser system would be a practical source of power, at least for the foreseeable future. However, it is generally believed that the amount of energy needed for the sustained laser burst can be produced by currently available COIL systems.

Unfortunately, an SBL system employing a COIL system necessarily means that the COIL system would have to rely on the limited amount of chemical supplies on board the vehicle at the time of launch. However, the COIL system would require resupply of those particular chemicals, especially basic hydrogen peroxide, chlorine, iodine, and nitrogen, after the SBL has conducted it's missile destruction mission. As the SBL systems are to be deployed in orbit above the Earth, rapid and frequent resupply of these chemicals would be highly problematic even under ideal conditions, and would be especially difficult during and immediately after any type of prolonged ballistic missile exchange. Accordingly, current SBL system designs which employ COIL systems have no means of resupplying the chemicals required for COIL system operation. Thus, the resupply problem has been identified as a significant impediment to future development and deployment of the SBL system.

While the difficulty of resupply may not be as extreme as for an SBL system, there are numerous other applications for COIL lasers for which fuel resupply is complex, costly, and difficult. For examples, COIL lasers may be used in ground and airborne applications, where fuel resupply may be hindered by location and weight restrictions.

Therefore, there exists a need for a system for collecting, reprocessing and recycling the spent chemical species required by a COIL system, especially one that is used in conjunction with either a ground-, airborne-, or space-based laser weapon system, irrespective of the source of the spent chemical species.

BACKGROUND ART

U.S. Pat. No. 3,992,685 discloses a chemical laser including a laser pump which is relatively lightweight with no moving parts. This produces a low pressure, regenerable, closed system for treating laser cavity exhaust gases to remove (i.e., pump) them from the system. The exhaust gases which emerge from the laser cavity of the chemical laser are pumped by reacting them preferably with titanium, titanium-zirconium alloys, zirconium, tantalum, etc. These gases include hydrogen, deuterium and their halides, the halogens, oxygen, $CO_2$, nitrogen and $H_2O$.

U.S. Pat. No. 4,028,069 discloses that contaminants, such as water and hydrogen sulfide, are removed from hydrocarbon streams by the use of beds of solid adsorbents including molecular sieves. The adsorbents are regenerated by heating, with the heating being performed in a closed-loop operation wherein a small quantity of the hydrocarbon being treated is recycled in a closed-loop recirculation system comprising the adsorbent and a heater until the adsorbent reaches an effective regeneration temperature.

U.S. Pat. No. 4,188,592 discloses a closed cycle chemical laser adapted for continuous wave operation. A first gas such as sulphur hexafluoride is decomposed by an electrical discharge means to provide at least some fluorine atoms which when combined with molecular hydrogen in a mixing chamber located upstream of and proximate to an optical power extraction chamber forms an excited laser species capable of stimulated emission to produce a continuous wave output beam. After passing through the optical cavity the effluent is purified by selective absorption and adsorption processes to eliminate the laser species from the effluent and to separate the hydrogen for recirculation back to the mixing chamber. The remaining effluent has its pressure increased, is supplemented with makeup feed gases and is recycled.

U.S. Pat. No. 4,357,309 discloses an apparatus and method for generating on demand a gaseous product from a liquid phase reaction of one reactant in the solid phase at ambient room conditions and another reactant in the liquid phase at ambient room conditions. The reactants preferably are iodine crystals, and liquid tetrahydronaphthalene (THN), with the gaseous product being hydrogen iodide. The liquid phase reaction, in the preferred embodiment, is $2I2+ C10H12 \rightarrow 4HI+C10H8$, known perse. Preferably, THN is pumped from a reservoir to be sprinkled over the iodine crystals in another reservoir. Some iodine dissolves into the liquid THN, with the resulting solution then percolating through a reaction zone containing a heated, porous packing material. Heat is transferred to the solution, thereby promoting, i.e., driving the above reaction. The gaseous hydrogen iodide is then removed from the reaction zone; typically for direct use, for example, in a chemical laser.

U.S. Pat. No. 5,974,027 discloses a high energy chemical laser capable of being operated in an aircraft to interdict and destroy theater ballistic missiles. A key to the chemical laser of the invention is the use of individual chemical lasers whose individual photon energy outputs can be combined into a single high-energy laser beam.

SUMMARY OF THE INVENTION

It is therefore a principal object of this invention to provide a new and improved chemical laser system.

It is another object of this invention to provide a new and improved chemical oxygen-iodine laser system.

It is another object of this invention to provide a new and improved chemical oxygen-iodine laser system for use with a space-based laser system.

It is another object of this invention to provide a new and improved system for collecting, reprocessing, and recycling the chemical species used by a chemical oxygen-iodine laser system.

It is another object of this invention to provide a new and improved system for collecting, reprocessing, and recycling the spent basic hydrogen peroxide produced by a chemical oxygen-iodine laser system.

It is another object of this invention to provide a new and improved system for collecting, reprocessing, and recycling the spent molecular oxygen utilized by a chemical oxygen-iodine laser system.

It is another object of this invention to provide a new and improved system for collecting, reprocessing, and recycling the spent molecular nitrogen or other diluents utilized by a chemical oxygen-iodine laser system.

It is another object of this invention to provide a new and improved system for collecting, reprocessing, and recycling the spent basic hydrogen peroxide produced by a chemical oxygen-iodine laser system, and converting chemicals in the spent basic hydrogen peroxide into potassium hydroxide and hydrogen peroxide.

It is another object of this invention to provide a new and improved system for collecting, reprocessing, and recycling the spent basic hydrogen peroxide produced by a chemical oxygen-iodine laser system, and converting the spent basic hydrogen peroxide into molecular chlorine and fresh basic hydrogen peroxide.

In accordance with a first embodiment of the present invention, a chemical oxygen-iodine laser system is provided having a source of potassium hydroxide, molecular chlorine gas, hydrogen peroxide, molecular iodine gas, and molecular nitrogen gas, wherein the system produces spent water, spent aqueous basic hydrogen peroxide, and spent laser exhaust gas comprising molecular oxygen, molecular nitrogen, molecular chlorine, molecular iodine, and molecular water, comprising:

a first collection system for collecting an amount of spent basic hydrogen peroxide comprised of spent aqueous potassium chloride;

a second collection system for collecting an amount of the spent laser exhaust gas;

a first processing system in fluid communication with the second collection system, wherein the first processing system receives the spent laser exhaust gas from the second collection system and separates the spent molecular oxygen gas from the spent molecular nitrogen gas;

a second processing system in fluid communication with the first processing system, wherein the second processing system receives the spent aqueous potassium chloride from the first collection system and converts the spent aqueous potassium chloride and the spent aqueous potassium iodide into a substance selected from the group consisting of molecular hydrogen, molecular chlorine, aqueous potassium hydroxide, and combinations thereof;

a third processing system in fluid communication with the first and second processing systems, wherein the molecular oxygen gas from the first processing system is combined with a substance selected from the group consisting of the spent water, the molecular hydrogen from the second processing system, or combinations thereof to form hydrogen peroxide; and a mixing system for mixing the hydrogen peroxide from the third processing system with the aqueous potassium hydroxide from the second processing system to form basic hydrogen peroxide.

In accordance with a second embodiment of the present invention, a chemical oxygen-iodine laser system is provided having a source of potassium hydroxide, molecular chlorine gas, hydrogen peroxide, molecular iodine gas, and molecular nitrogen gas, wherein the system produces spent water, spent aqueous basic hydrogen peroxide, and spent laser exhaust gas comprising molecular oxygen, molecular nitrogen, molecular chlorine, molecular iodine, and molecular water, comprising:

a first collection system for collecting an amount of spent basic hydrogen peroxide comprised of spent aqueous potassium chloride;

a second collection system for collecting an amount of the spent laser exhaust gas;

a first processing system in fluid communication with the first collection system, wherein the first processing system separates the spent aqueous potassium chloride into a first stream comprising water and a second stream comprising aqueous potassium;

a second processing system in fluid communication with the second processing system, wherein the second processing system receives the spent laser exhaust gas and separates the molecular oxygen and the molecular nitrogen from the molecular chlorine and the molecular iodine;

a third processing system in fluid communication with the first processing system, wherein the third processing system converts the spent aqueous potassium chloride into a substance selected from the group consisting of molecular hydrogen, molecular chlorine, aqueous potassium hydroxide, and combinations thereof;

a fourth processing system in fluid communication with the second processing system, wherein the fourth processing system separates the molecular oxygen from the molecular nitrogen;

a fifth processing system in fluid communication with the first, third, and fourth processing systems, wherein the molecular oxygen from the fourth processing system is combined with a substance selected from the group consisting of the spent water from the first processing system, the molecular hydrogen from the third processing system, or combinations thereof to form hydrogen peroxide; and a mixing system for mixing the hydrogen peroxide from the fourth processing system with the aqueous potassium hydroxide from the third processing system to form basic hydrogen peroxide.

In accordance with a second embodiment of the present invention, a chemical oxygen-iodine laser system is provided having a source of potassium hydroxide, molecular chlorine gas, hydrogen peroxide, molecular iodine gas, and molecular nitrogen gas, wherein the system produces spent water, spent aqueous basic hydrogen peroxide, and spent laser exhaust gas comprising molecular oxygen, molecular nitrogen, molecular chlorine, molecular iodine, and molecular water, comprising:

a first collection system for collecting an amount of spent basic hydrogen peroxide comprised of spent aqueous potassium chloride;

a second collection system for collecting an amount of the spent laser exhaust gas;

a first processing system in fluid communication with the first collection system, wherein the first processing system separates the spent aqueous potassium chloride into a first stream comprising water and a second stream comprising aqueous potassium;

a second processing system in fluid communication with the second processing system, wherein the second processing system receives the spent laser exhaust gas and separates the molecular oxygen and the molecular nitrogen from the molecular chlorine and the molecular iodine, and separates the molecular chlorine from the molecular iodine;

a third processing system in fluid communication with the first processing system, wherein the third processing system converts the spent aqueous potassium chloride into a substance selected from the group consisting of molecular hydrogen, molecular chlorine, aqueous potassium hydroxide, and combinations thereof;

a fourth processing system in fluid communication with the second processing system, wherein the fourth processing system separates the molecular oxygen from the molecular nitrogen;

a fifth processing system in fluid communication with the first, third, and fourth processing systems, wherein the molecular oxygen from the fourth processing system is combined with a substance selected from the group consisting of the spent water from the first processing system, the molecular hydrogen from the third processing system, or combinations thereof to form hydrogen peroxide; and a mixing system for mixing the hydrogen peroxide from the fourth processing system with the aqueous potassium hydroxide from the third processing system to form basic hydrogen peroxide;

wherein the molecular chlorine is returned to the molecular chlorine gas source and the molecular iodine is returned to the molecular iodine gas source;

wherein the basic hydrogen peroxide from the mixing system is introduced into the basic hydrogen peroxide source.

These and other objects, advantages and novel features of the present invention will become apparent from the following detailed description of the invention when considered in conjunction with the accompanying drawing.

BRIEF DESCRIPTION OF THE DRAWINGS

The present invention will become more fully understood from the detailed description and the accompanying drawing, wherein.

DETAILED DESCRIPTION OF THE PREFERRED EMBODIMENTS

Figure 1:
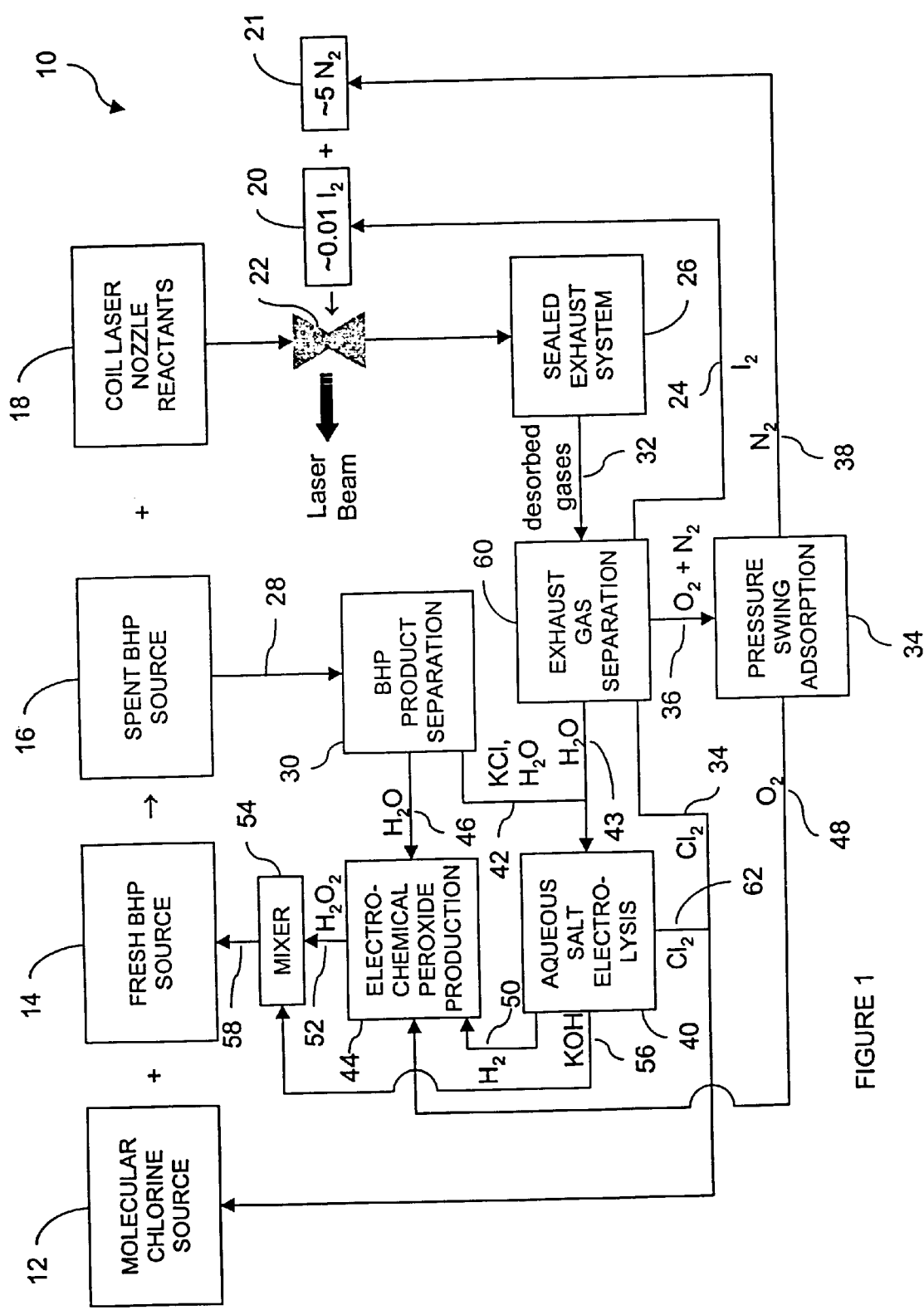
FIG. 1 is a schematic illustration of a system for collecting spent basic hydrogen peroxide and spent laser exhaust gas and recycling same into fresh basic hydrogen peroxide, molecular chlorine, molecular iodine, molecular nitrogen, and molecular oxygen, in accordance with one embodiment of the present invention.

In order to fully appreciate the features and advantages of the present invention, it is first necessary to understand the basic overall chemical reaction which occurs during COIL operation. Simply stated, the overall reaction can be summarized as follows:

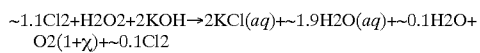

$$\sim 1.1 Cl_2 + H_2O_2 + 2KOH \rightarrow 2KCl(aq) + \sim 1.9 H_2O(aq) + \sim 0.1 H_2O + O_2(1+\chi) + \sim 0.1 Cl_2$$

In this equation, starting from the left hand side of the equation and progressing to the right, approximately 1.1 moles of molecular chlorine is combined with fresh basic hydrogen peroxide (BHP), which provides one mole of hydrogen peroxide and 2 moles of potassium hydroxide. This mixture is reacted together and produces spent BHP (i.e., 2 moles of potassium chloride (i.e., a salt) and approximately 1.9 moles of water in solution) as well as some of the laser mixing nozzle gaseous reactants (i.e., approximately 0.1 moles of gaseous water, 1 mole of molecular oxygen (in delta singlet and ground state forms) and approximately 0.1 moles of molecular chlorine which does not react with BHP).

These gaseous reactants are then introduced into the laser mixing nozzle in the presence of molecular iodine (approximately 0.01 moles) and the diluent gas (e.g., 5 moles of molecular nitrogen). The diluent gas may also include heavy inert gases such as argon, krypton, and xenon, freon, freon substitutes, and other gases known to be non-reacting with the gases in the laser nozzle cavity but which are condensable or adsorbable in a sealed exhaust system (e.g., chlorine). As previously described, a laser beam is then generated, with the waste gases typically exhausted through a vacuum system or directly to space, in the situation where the COIL system is space-based.

Thus, the present invention is primarily concerned with conserving the available supplies of fresh BHP, molecular chlorine, molecular iodine, and molecular nitrogen in a space-based or other COIL system, where resupply of any chemicals is difficult. Furthermore, the present invention is also concerned with recycling, where possible, any spent supplies of BHP in order to generate fresh BHP, as well as recycled molecular chlorine, molecular iodine, molecular nitrogen, and other chemical species.

Referring to FIG. 1, there is shown a schematic illustration of an illustrative system 10 for collecting spent basic hydrogen peroxide and spent laser exhaust gas and recycling same into fresh basic hydrogen peroxide, molecular chlorine, molecular iodine, molecular nitrogen, and molecular oxygen, in accordance with one embodiment of the present invention.

In this view, the system 10 includes a source of molecular chlorine 12 and a source of basic hydrogen peroxide (BHP) 14 which are combined together to produce spent BHP, which is a solution containing aqueous potassium chloride (potassium chloride (KCl) and water ($H_2O$)) as well as unreacted potassium hydroxide and hydrogen peroxide (i.e., BHP). The molecular chlorine may be mixed with nitrogen or other diluent gas prior to reaction. The spent BHP is then collected in a collection system 16 (e.g., a storage tank) for later use, as will be described herein.

The remaining COIL laser nozzle reactants 18 (i.e., water, singlet delta oxygen and molecular chlorine) are then combined with a source 20 of molecular iodine carried in a source 21 of molecular nitrogen (or other compound) diluent gas in the COIL laser mixing nozzle 22, whereupon a laser beam 24 is generated with the waste laser gases (e.g., oxygen, nitrogen, trace amounts of water, iodine and chlorine) exhausted into a sealed exhaust system 26, as opposed to being exhausted out into space. In this manner, the source 20 of molecular iodine and the source 21 of molecular nitrogen can be resupplied through a recycling system to be described herein.

The sealed exhaust system 26 preferably includes a means for selectively collecting, storing, and releasing the exhaust gases of the COIL system, especially oxygen and nitrogen gases. Preferably, the water, chlorine and iodine gases are first condensed and then the nitrogen and oxygen gases are absorbed (e.g., cryosorbed onto zeolite). For example, the exhaust gases can enter a high temperature bed (HTB), through a suitable conduit, where the water, chlorine and iodine gases are completely or substantially completely condensed to solids or liquids. The HTB preferably comprises: (1) a bed of heat and gas storage media, which may be passive or undergo a phase change on heating; and (2) suitable gas passages to permit the laser exhaust gas to flow through the bed with acceptably low pressure drop. The nitrogen and oxygen gases then pass into a low temperature bed (LTB), through a suitable conduit, which contains a zeolite absorption bed. In the event that a diluent less volatile than nitrogen is used it may condense in the HTB rather than adsorb in the LTB.

To begin the recycling process, the spent BHP is transported from the storage system 16 via an appropriate conduit or pipe 28 to a first processing system 30, which is preferably a system which employs a separation process capable of separating liquid and solid materials. The absorbed gases (e.g., nitrogen and oxygen) and condensed gases (e.g., chlorine and iodine) from the sealed exhaust system 26 are transported to a second processing system 60 via an appropriate conduit or pipe 32. Once these materials are introduced into the second processing system 60, it is generally necessary to separate the various chemical species before further processing and recycling can take place.

The simplest recycling step involves recycling the nitrogen gas back to the source 21 of molecular nitrogen. The gases from the second processing system 60, which will typically contain nitrogen and oxygen gas are transported to a third processing system 34 via an appropriate conduit or pipe 36. The third processing system 34 preferably employs a pressure swing adsorption system or a membrane separator system that allows gaseous mixtures to be separated into their individual constituent gases. In this case, the third processing system 34 separates the nitrogen gas from the oxygen gas. The nitrogen gas is then simply transported back to the source 21 of molecular nitrogen via an appropriate conduit or pipe 38. The separated oxygen gas will be utilized later, as described herein. The gases from the second processing system 60 are also separated into a molecular chlorine stream which is returned to the molecular chlorine source 12 via conduit or pipe 34, and molecular iodine, which is returned to the iodine source 20 via conduit or pipe 24.

Another recycling step involves the production of potassium hydroxide for replenishing the supply of fresh BHP. To accomplish this task, the solid and liquid materials (e.g., potassium chloride and water) from the first processing system 30 are transported to a fourth processing system 40 via an appropriate conduit or pipe 42. Preferably, the fourth processing system 40 employs electrolysis to treat the salts, which may be in an aqueous form. Additional water may be sent to this process from the second processing system 60 via conduit or pipe 43. The electrolysis system can be electrically powered using solar power, for example from the vehicle's solar panels or other electrical source. The potassium chloride is then converted, preferably via electrolysis, into three main constituent chemical species: molecular hydrogen, aqueous potassium hydroxide, and molecular chlorine.

Still another recycling step involves the production of hydrogen peroxide for replenishing the supply of fresh BHP. Because of the integrated nature of the system 10, and the fact that dual sources of recyclable materials are utilized, the present invention provides a number of ways of producing the hydrogen peroxide.

In general, it is preferred to utilize the molecular hydrogen and molecular oxygen produced or recovered elsewhere in the system 10. Depending on the methodology employed, the production of fresh BHP can be done by a direct combination of molecular hydrogen and molecular oxygen or by combining molecular hydrogen and some of the molecular oxygen to form water, and then by oxidation of water to hydrogen peroxide with the remaining molecular oxygen.

Direct oxidation can be done over a suitable catalyst or by use of a pair of chemicals that are cyclically reduced and oxidized, producing hydrogen peroxide as the net product.

Oxidation of water can be done over a catalyst or by use of an electrochemical cell. Even when the molecular hydrogen and molecular oxygen are reacted directly, generally water is required as the mediator and carrier for the hydrogen peroxide product.

The hydrogen peroxide can also be made in an aqueous acidic or basic medium, in which case it may be necessary to provide a source of acid (base is of course readily available from the prior process which produced potassium hydroxide).

Producing acid is probably best accomplished by reacting molecular chlorine with some of the molecular hydrogen (forming hydrogen chloride, which dissolves to form hydrochloric acid) or with water to form a mixture of hydrochloric acid and hypochlorous acid.

In cases in which hydrogen peroxide is being made in basic medium, the potassium hydroxide is fed into a hydrogen peroxide producing reactor. Achieving the desired ratio of hydrogen peroxide to potassium hydroxide may require that some of the potassium hydroxide be reacted with hydrochloric acid to re-convert it to potassium chloride.

The processing of the aqueous potassium chloride, as well as the production of hydrogen peroxide, may require additional water, which can be separately removed from the spent BHP.

By way of a non-limiting example, a first method includes introducing the water from the first processing system 30 into a fifth processing system 44 via an appropriate conduit or pipe 46 and combining the water with the molecular oxygen produced by the second processing system 34 which is also introduced into the fifth processing system 44 via an appropriate conduit or pipe 48. Preferably, the fifth processing system 44 produces the hydrogen peroxide utilizing an electrogeneration system, i.e., uses electrical power to produce or generate the hydrogen peroxide. In accordance with a highly preferred embodiment of the present invention, an electrochemical cell is used to generate the hydrogen peroxide. The fifth processing system 44 can be electrically powered using solar power, for example from the vehicle's solar panels or other electrical source.

Another non-limiting method includes introducing the hydrogen from the fourth processing system 40 into the fifth processing system 44 via an appropriate conduit or pipe 50 and combining the hydrogen with the molecular oxygen produced by the third processing system 34 which is also introduced into the fifth processing system 44 via conduit or pipe 48.

Once the hydrogen peroxide is produced, it is then transported via an appropriate conduit or pipe 52 to a mixer system 54 where it is combined, in proper stoichiometric ratios, with the potassium hydroxide which is also transported via an appropriate conduit or pipe 56 to the mixer system 50.

When the hydrogen peroxide and the aqueous potassium hydroxide are finally mixed the result is fresh BHP, which is then transported to the fresh BHP source 14 via an appropriate conduit or pipe 58, thus preserving and conserving the amount of fresh BHP that is required by the COIL system associated with an SBL system.

The molecular chlorine gas from the fourth processing system 40 is returned to the molecular chlorine source 12 via an appropriate conduit or pipe 62. If this material is in aqueous form, a drying operation (e.g., evaporation) is probably advisable.

In this manner, a COIL system employing the recycling system of the present invention can carry the same amount of supply chemicals, such as molecular chlorine, molecular iodine, molecular nitrogen, and fresh BHP, as a conventional COIL system and can operate for a longer period of time and execute more laser burst operations before needing to be resupplied.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A chemical oxygen-iodine laser system coupled to a source of potassium hydroxide, molecular chlorine gas, hydrogen peroxide, molecular iodine gas, and molecular nitrogen gas, wherein the system produces spent water, spent aqueous basic hydrogen peroxide, and spent laser exhaust gas comprising molecular oxygen, molecular nitrogen, molecular chlorine, molecular iodine, and molecular water, comprising:
    a first collection system for collecting an amount of spent basic hydrogen peroxide comprised of an amount of spent aqueous potassium chloride or spent aqueous potassium iodide;
    a second collection system for collecting an amount of the spent laser exhaust gas;
    a first processing system in fluid communication with the second collection system, wherein the first processing system receives the spent laser exhaust gas from the second collection system and separates the spent molecular oxygen gas from the spent molecular nitrogen gas;
    a second processing system in fluid communication with the first processing system, wherein the second processing system receives the amount of spent aqueous potassium chloride or spent aqueous potassium iodide from the first collection system and converts the spent aqueous potassium chloride or the spent aqueous potassium iodide into a substance selected from the group consisting of molecular hydrogen, molecular chlorine, aqueous potassium hydroxide, and combinations thereof;
    a third processing system in fluid communication with the first and second processing systems, wherein the molecular oxygen gas from the first processing system is combined with a substance selected from the group consisting of the spent water, the molecular hydrogen from the second processing system, or combinations thereof to form hydrogen peroxide; and
    a mixing system for mixing the hydrogen peroxide from the third processing system with the aqueous potassium hydroxide from the second processing system to form basic hydrogen peroxide.

2. The invention according to claim 1, further comprising:
    a fourth processing system in fluid communication with the second processing system, wherein the fourth processing system receives the molecular chlorine and the molecular iodine from the first processing system and separates the molecular chlorine from the molecular iodine.

3. The invention according to claim 2, wherein the molecular chlorine is returned to the molecular chlorine gas source.

4. The invention according to claim 2, wherein the molecular iodine is returned to the molecular iodine gas source.

5. The invention according to claim 1, wherein the basic hydrogen peroxide from the mixing system is introduced into the basic hydrogen peroxide source.

6. The invention according to claim 1, wherein the first processing system comprises a system selected from the group consisting of a pressure swing adsorption system, a membrane separator system, and combinations thereof.

7. The invention according to claim 1, wherein the second processing system comprises an electrolysis system.

8. The invention according to claim 1, wherein the third processing system comprises an electrogeneration system.

9. The invention according to claim 1, wherein at least one of the processing systems is powered by electrical power generated from a light source.

10. The invention according to claim 1, wherein the second collection system comprises a sealed exhaust system for removing exhaust gas from a laser cavity of the chemical oxygen-iodine laser system, the sealed exhaust system comprising:
    a condenser assembly for condensing the spent molecular chlorine, molecular iodine, and molecular water contained in the exhaust gas; and
    a sorption assembly for sorbing the spent molecular oxygen and molecular nitrogen contained in the exhaust gas.

11. A chemical oxygen-iodine laser system coupled to a source of potassium hydroxide, molecular chlorine gas, hydrogen peroxide, molecular iodine gas, and molecular nitrogen gas, wherein the system produces spent water, spent aqueous basic hydrogen peroxide, and spent laser exhaust gas comprising molecular oxygen, molecular nitrogen, molecular chlorine, molecular iodine, and molecular water, comprising:
    a first collection system for collecting an amount of spent basic hydrogen peroxide comprising spent aqueous potassium chloride;
    a second collection system for collecting an amount of the spent laser exhaust gas;
    a first processing system in fluid communication with the first collection system, wherein the first processing system separates the spent aqueous potassium chloride into a first stream comprising water and a second stream comprising aqueous potassium chloride;
    a second processing system in fluid communication with the second collection system, wherein the second processing system receives the spent laser exhaust gas and separates the molecular oxygen and the molecular nitrogen from the molecular chlorine and the molecular iodine;
    a third processing system in fluid communication with the first processing system, wherein the third processing system converts the spent aqueous potassium chloride into a substance selected from the group consisting of molecular hydrogen, molecular chlorine, aqueous potassium hydroxide, and combinations thereof;
    a fourth processing system in fluid communication with the second processing system, wherein the fourth processing system separates the molecular oxygen from the molecular nitrogen;
    a fifth processing system in fluid communication with the first, third, and fourth processing systems, wherein the molecular oxygen from the fourth processing system is combined with a substance selected from the group consisting of the spent water from the first processing system, the molecular hydrogen from the third processing system, or combinations thereof to form hydrogen peroxide; and a mixing system for mixing the hydrogen peroxide from the fifth processing system with the aqueous potassium hydroxide from the third processing system to form basic hydrogen peroxide.

12. The invention according to claim 11, wherein the second processing system separates the molecular chlorine from the molecular iodine.

13. The invention according to claim 11, wherein the molecular chlorine is returned to the molecular chlorine gas source and the molecular iodine is returned to the molecular iodine gas source.

14. The invention according to claim 11, wherein the basic hydrogen peroxide from the mixing system is introduced into the basic hydrogen peroxide source.

15. The invention according to claim 11, wherein the fourth processing system comprises a system selected from the group consisting of a pressure swing adsorption system, a membrane separator system, and combinations thereof.

16. The invention according to claim 11, wherein the third processing system comprises an electrolysis system.

17. The invention according to claim 11, wherein the fifth processing system comprises an electrogeneration system.

18. The invention according to claim 11, wherein at least one of the processing systems is powered by electrical power generated from a light source.

19. The invention according to claim 11, wherein the second collection system comprises a sealed exhaust system for removing exhaust gas from a laser cavity of the chemical oxygen-iodine laser system, the sealed exhaust system comprising:

a condenser assembly for condensing the spent molecular chlorine, molecular iodine, and molecular water contained in the exhaust gas; and a sorption assembly for sorbing the spent molecular oxygen and molecular nitrogen contained in the exhaust gas.

20. A chemical oxygen-iodine laser system coupled to a source of potassium hydroxide, molecular chlorine gas, hydrogen peroxide, molecular iodine gas, and molecular nitrogen gas, wherein the system produces spent water, spent aqueous basic hydrogen peroxide, and spent laser exhaust gas comprising molecular oxygen, molecular nitrogen, molecular chlorine, molecular iodine, and molecular water, comprising:

a first collection system for collecting an amount of spent basic hydrogen peroxide comprising spent aqueous potassium chloride;

a second collection system for collecting an amount of the spent laser exhaust gas;

a first processing system in fluid communication with the first collection system, wherein the first processing system separates the spent aqueous potassium chloride into a first stream comprising water and a second stream comprising aqueous potassium chloride;

a second processing system in fluid communication with the second collection system, wherein the second processing system receives the spent laser exhaust gas and separates the molecular oxygen and the molecular nitrogen from the molecular chlorine and the molecular iodine, and separates the molecular chlorine from the molecular iodine;

a third processing system in fluid communication with the first processing system, wherein the third processing system converts the spent aqueous potassium chloride into a substance selected from the group consisting of molecular hydrogen, molecular chlorine, aqueous potassium hydroxide, and combinations thereof;

a fourth processing system in fluid communication with the second processing system, wherein the fourth processing system separates the molecular oxygen from the molecular nitrogen;

a fifth processing system in fluid communication with the first, third, and fourth processing systems, wherein the molecular oxygen from the fourth processing system is combined with a substance selected from the group consisting of the spent water from the first processing system, the molecular hydrogen from the third processing system, or combinations thereof to form hydrogen peroxide; and a mixing system for mixing the hydrogen peroxide from the fifth processing system with the aqueous potassium hydroxide from the third processing system to form hydrogen peroxide;

wherein the molecular chlorine is returned to the molecular chlorine gas source and the molecular iodine is returned to the molecular iodine gas source;

wherein the basic hydrogen peroxide from the mixing system is introduced into the basic hydrogen peroxide source.

* * * * *